United States Patent [19]

Tomita et al.

[11] Patent Number: 4,829,187

[45] Date of Patent: May 9, 1989

[54] UV-RAY SENSITIVE COMPOSITION AND ELEMENT FOR MEASURING UV-RAY DOSE

[75] Inventors: Kenichi Tomita; Masaru Suetsugu; Minoru Fukuda, all of Yokohama; Takao Higashi, Tokyo; Norimichi Koizumi, Chigasaki, all of Japan

[73] Assignee: Shiseido Company Ltd., Tokyo, Japan

[21] Appl. No.: 80,513

[22] PCT Filed: Nov. 11, 1986

[86] PCT No.: PCT/JP86/00572

§ 371 Date: Jul. 8, 1987

§ 102(e) Date: Jul. 8, 1987

[87] PCT Pub. No.: WO87/03086

PCT Pub. Date: May 21, 1987

[30] Foreign Application Priority Data

Nov. 11, 1985 [JP] Japan .................................. 60-250678

[51] Int. Cl.⁴ ............................................... G01J 1/00
[52] U.S. Cl. .................................................. 250/474.1
[58] Field of Search ..................... 250/474.1; 436/902; 430/541

[56] References Cited

U.S. PATENT DOCUMENTS

| | | | |
|---|---|---|---|
| 3,902,903 | 9/1975 | Stano et al. | 430/541 |
| 3,903,423 | 9/1975 | Zweig | 250/474.1 |
| 4,308,459 | 12/1981 | Williams | 250/474.1 |

FOREIGN PATENT DOCUMENTS

| | | | |
|---|---|---|---|
| 44-22941 | 9/1969 | Japan | 430/541 |
| 60-89352 | 5/1985 | Japan | 430/541 |

OTHER PUBLICATIONS

Davis et al., "Possible Dosimeter of U.V. Nature", vol. 261, May 13, 1976.

*Primary Examiner*—Carolyn E. Fields
*Assistant Examiner*—Richard Hanig
*Attorney, Agent, or Firm*—Sprung Horn Kramer & Woods

[57] ABSTRACT

A UV-ray sensitive composition, comprising a photo activator forming a free radical by the irradiation of UV-rays, a discoloring agent which exhibits a color change in visible region of spectrum through the action of this free radical, and a UV-ray absorber.

6 Claims, 1 Drawing Sheet

UV-RAY SENSITIVE COMPOSITION AND ELEMENT FOR MEASURING UV-RAY DOSE

TECHNICAL FIELD

This invention relates to a UV-ray sensitive composition containing a photo activator forming a free radical, a discoloring agent exhibiting a color change in visible region of spectrum by the action of this free radical, and a UV-ray absorber. This UV-ray sensitive composition can measure the irradiated dose of UV-rays, and therefore, the present invention also relates to an element, which can be easily produced and handled, for measuring a UV-ray dose.

BACKGROUND ART

Sunburn is an acute dermatitis which occurs when sunlight, particularly UV-rays, has been allowed to act excessively over the permissible physiological range of the skin, and is expressed as erythema (sunburn) and blackening (suntan). That is, although the intensity of the sunburn and the lapse thereafter will generally vary in accordance with the quantity and intensity of the UV-ray dosage generally acting on the skin, first a congestion of capillaries within the skin will occur, followed by erythema (sunburn) accompanied by edewa. After several days, the inflammation disappears, simultaneously with a disappearance of the erythema, and a melanin dye is deposited within the skin to cause a blackening (suntan) of the skin.

UV-rays are classified by wavelength, i.e., into a short wavelength UV-ray region of 280 nm or lower (UV-C), a medium wavelength UV-ray region of 280 to 320 nm (UV-B), and longer wavelength UV-ray region of 320 to 400 nm (UV-A), but since UV-rays having a wavelength of 290 nm or lower are absorbed by the ozone layer in the atmosphere, and do not reach ground level, only the UV-rays having a wavelength of from 290 to 400 nm (UV-B and UV-A) are biologically important. Namely, UV-rays having a wavelength of 290 to 320 nm (UV-B) are the primary cause of acute erythema (sunburn), and are known as erythema region UV-rays, and UV-rays having a wavelength of 320 to 400 nm (UV-A) are known as the blackening region UV-rays, since these UV-rays promote blackening (suntan) of the skin.

In recent years, UV-ray absorbers, etc., have been developed and various cosmetics for preventing sunburn of the human skin have been developed and are widely used. However, the intensity of UV-rays is greatly influenced by the season, the time of day, and the weather, among other factors. Accordingly, as a counter-measure against sunburn, it is necessary to measure the irradiated dose of UV-rays by a suitable and simple means. Various methods for this measurement have been developed in the prior art. For example, dosimeters for determining an irradiated dose from fluorescent amounts or absorbance generated corresponding to the irradiated dose when a UV-ray with a specific wavelength is irradiated, are known.

However, these prior art methods of measuring a UV-ray does require great skill and a considerably long measurement time when measuring such a dose, and the measuring devices concerned have a drawback in that they are complicated and expensive.

In this connection, compositions which are discolored by the irradiation of UV-rays are disclosed in Japanese Patent Publication (Kokoku) No. 40-17986 (photosensitive composition), Japanese Patent Publication (Kokoku) No. 44-22941 (photosensitive printing material), and Japanese Unexamined Patent Publication (Kokai) No. 60-89352 (UV-ray discoloration sheet), among others, but all of these compositions undergo discoloration by irradiation of UV-rays within an extremely short time, and therefore, although the presence of UV-rays can be determined by the color change, it is impossible to measure the irradiation dose of UV-rays.

DISCLOSURE OF THE INVENTION

Accordingly, an object of the present invention is to provide a UV-ray sensitive composition which undergoes discoloration corresponding to the irradiation dose of the UV-rays, and which can be easily produced and handled, and is capable of simply measuring the irradiated dose of UV-rays.

More specifically, according to the present invention, there is provided a UV-ray sensitive composition comprising a photo activator forming a free radical by UV-ray irradiation, a discoloring agent which exhibits a color change in visible region of spectrum by the action of the free radical, and a UV-ray absorber, and an element combined with such an agent for measurement of the UV-ray dose.

BRIEF DESCRIPTION OF THE DRAWINGS

In the following, the present invention is described in detail by referring to the drawings, wherein.

PREFERRED EMBODIMENTS FOR CARRYING OUT THE INVENTION

Figure 1:
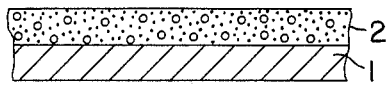
FIG. 1 is a sectional view of a first embodiment of the element for measurement of a UV-ray dose according to the present invention.

The photo activator to be used in the composition of the present invention is known in this field of art, and representative examples thereof may include, for example, the compounds represented by the formula (I):

R—C—X         (I)

(wherein, R represents allyl, alkyl, aralkyl, aroyl, alkenyl group, halogen, hydrogen, and X represents a halogen), such as carbon tetrabromide, carbon tetrachloride, hexachloroethane, pentabromoethane, p-nitrobenzotribromide, bromotrichloromethane, hexabromoethane, benzotrichloride, iodoform, tetrachlorotetrahydronaphthalene, chloral, bromal, 1,1,1-tribromo-2-methyl-2-propanol, 1,1,2,2-tetrabromoethane, 2,2,2-tribromoethanol, trichloroacetamide, 1,1,1-trichlorodimethyl-2-propanol, α,α,α-trichlorotoluene, etc.

As another photo activator, there are the compounds represented by the formula (II):

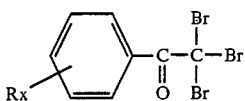

(wherein Rx represents 1 to 5 substituents on a benzene ring, and specific examples of such substituents may include a nitro group, halogen group, alkyl group, haloalkyl group, acetyl group, haloacetyl group, alkaryl group, alkoxy group, etc., and all of the substituents are not required to be the same), and specific examples of such compounds may include o-nitro-α,α,α-tribromoacetophenone, m-nitro-α,α,α-tribromoacetophenone, p-nitro-α,α,α-tribromoacetophenone, α,α,α-tribromoacetophenone, α,α,α-m-tetrabromoacetophenone, α,α,α-tribromo-3,4-dichloroacetophenone, α,α,α-p-tetrabromo-acetophenone, α,α,α,α',α',α'-hexabromo-p-diacetylbenzene.

As still another photo activator, there are the compounds represented by the formula (III):

$$R-S-X \quad (III)$$

(wherein R represents alkyl group, allyl group, allyl group having substituent, and X represents a halogen), and specific example of such compounds may include 2,4-dinitrobenzenesulfenyl chloride, o-nitrobenzenesulfenyl chloride.

As still another photo activator, there are the compounds represented by the formula (IV):

(wherein A may be substituted with a heterocyclic compound residue, $R^1$, $R^2$ and $R^3$ represent independently a group selected from hydrogen, chlorine, bromine, etc., but all thereof cannot be hydrogens at the same time), and specific examples of such compounds may include ω,ω,ω-tribromoquinaldine, ω,ω-dibromoquinaldine, 2-ω,ω,ω-tribromo-methyl-4-methylquinoline, ω,ω-dichloromethylquinoline, ω-bromolepidine, 2-ω-bromomethyl-isoquinoline, 4-ω,ω,ω-tribromomethylpyrimidine, 4-phenyl-6-ω,ω,ω-tribromomethylpyrimidine, 2-ω,ω,ω-trichloromethyl-6-nitro-benzothiazole, 1-phenyl-3-ω,ω,ω-trichloromethylpyrazole, ω,ω,ω-tribromolepidinebromomethylate, α-ω,ω-dibromomethyl-4-chloro-pyridine, 1-methyl-2-(chloromethyl)-benzoimidazole, 2,5-ditribromomethyl-3,4-dibromothiophene and the like.

As still another photo activator, there are the compounds represented by the formula (V):

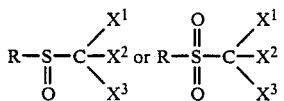

(wherein $X^1$, $X^2$ and $X^3$ each independently is a group selected from hydrogen, chlorine and bromine, but all thereof cannot be hydrogens at the same time, and R represents a substituted or unsubstituted aryl, hetero residue), and specific examples of such compounds may include hexabromodimethyl sulfoxide, pentabromodimethyl sulfoxide, hexabromodimethyl sulfone, trichloromethylphenyl sulfone, tribromomethylphenyl sulfone, trichloromethyl-p-chlorophenyl sulfone, tribromomethyl-p-nitrophenyl sulfone, 2-trichloromethylbenzothiazole sulfone, 4,6-dimethylpyridine-2-tribromomethyl sulfone, tetrabromodimethyl sulfone, 2,4-dichlorophenyltrichloromethyl sulfone, 2-methyl-4-chlorophenyltrichloromethyl sulfone, 2,5-dimethyl-4-chlorophenyltrichloromethyl sulfone, 2,4-dichlorophenyltribromomethyl sulfone and the like.

The discoloring agent to be used in the present invention is a compound which is discolored by the action of the free radical formed by the photo activator under the influence of UV-rays, as described above, and such discoloring agents are also well known in this field of art. These discoloring agents are inherently colorless substances, which are colored by the action of the free radical, and those having inherent colors which are discolored into another color by the action of the free radical, or are decolored, and representative examples of these may include, as examples of the former, amine compounds such as diphenylamine, dibenzylamine, triphenylamine, N-hydroxyethyl-N-ethylaniline, p,p'-methylenebis(N,N-diethylaniline) and the like, leucobases of the dyes such as leucocrystal violet, leucomalachite green, Michler's hydrol, fluoran compounds such as 3-diethylamino-7-chlorofluoran, 3-methylamino-6-chlorofluoran, 3-dimethylamino-6-methoxyfluoran, 3-cyclohexylamino-6-chlorofluoran, 3-diethylaminobenzo(a)-fluoran, 3-diethylamino-6-aminofluoran, 3,6-dimethoxyfluoran, 3-diethylamino-7-dibenzylaminofluoran, 3-diethylamino-6-methyl-7-chlorofluoran and the like, polyarylalkane compounds such as bis(4-diethylamino-2-methylphenyl)phenylmethane, tris(4-diethylamino-2-methylphenyl)methane, bis(4-dimethylamino-2-methoxyphenyl)phenylmethane, bis(4-diethylamino-2methylphenyl)(4-diethylaminophenyl)methane, bis(4-diethylamino-2-methylphenyl)(3,4-dimethoxyphenyl)methane, bis(4-dibenzylamino-2-methylphenyl)phenylmethane and the like, pyrazoline compound such as 1-phenyl-3-(p-diethylamino) styryl-5-(p-diethylamino)phenylpyrazoline and the like. On the other hand, as the examples of the latter, various kinds of dyes such as diphenylmethane type, triphenylmethane type, thiazine type, oxazine type, xanthene type, anthraquinone type, iminonaphthoquinone type, azomethine type, etc., can be effectively used, and examples of these may include Auramine, Victoria Blue, benzoylmethylene blue, cinnamoylmethylene blue, rhodamine, 4-p-diethylaminophenyliminonaphthoquinone, p-methoxybenzoyl-p-diethylamino-o-methylphenyliminoacetoanilide, 1-phenyl-3-methyl-4-p-diethylaminophenylimino-5-pyrazolone and others.

Next, as the UV-ray absorber to be used in the UV-ray sensitive composition, there may be included any UV-ray absorber generally employed in the prior art, and specific examples thereof may include, for example, p-aminobenzoic acid derivatives (PABA derivatives), cinnamic acid derivatives, salicylic acid derivatives, camphor derivatives, benzophenone derivatives, urocanic acid derivatives, nitrogen containing heterocyclic derivatives, etc.

The UV-ray sensitive composition according to the present invention can be used for the measurement of a UV-ray dose as described below by coating on an appropriate support. As such supports, any material such as paper, plastic film, glass plate, metal plate, etc., may be used, but it is preferable to use an paper base for photography, a plastic film, etc., to obtain sharp colors.

In the case of coating the UV-ray sensitive composition according to the present invention as described above on a support, an appropriate polymeric binder having a film forming property, for example, cellulose derivatives such as ethyl cellulose, cellulose acetate, hydroxypropyl cellulose, carboxymethyl cellulose sodium salt, etc., vinyl type polymers such as polyvinyl chloride, polyvinyl acetate, etc., acrylic resins such as polyacrylate, polymethacrylate and copolymers of these, etc., coating resins such as silicone, alkyd, polyamide, linear polyesters, solvent soluble type engineering plastics such as polycarbonate, polyarlate, polysulfone, aromatic polyesters, copolymers such as ethylene-vinyl acetate copolymer, ethylene-acrylic acid copolymer, etc., may be coated as a solution dissolved in a solvent (e.g. methanol, ethanol, isopropanol, benzene, toluene, xylene, ethyl acetate, isobutyl acetate, acetone, 2-butanone, 4-methyl-2-pentanone, tetrahydrofuran, dioxane, methylene chloride, chloroform, 1,1,1-trichloroethane, chlorobenzene, dimethylacetoamide, dimethyl sulfoxide, N-methyl-2-pyrrolidone). In the UV-ray sensitive composition of the present invention, pigments, plasticizers, etc., other than the essential components as mentioned above can be formulated if desired.

Figure 2:
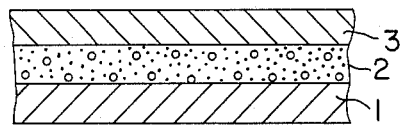
FIG. 2 is a sectional view of a preferred embodiment of the element for measurement of a UV-ray dose shown in FIG. 1.

The element for the measurement of the UV-ray dose according to the present invention can be constituted by coating a layer 2 containing a photo activator, a discoloring agent, and a UV-ray absorber on a support 1 as shown in FIG. 1, and the element for the measurement of the UV-ray dose can be protected by coating the surface thereof with a protective layer 3 of a transparent polymeric material having a film forming property (e.g. methyl cellulose, hydroxypropyl cellulose, polymethyl acrylate, polyvinyl chloride) as shown in FIG. 2.

Figure 3:
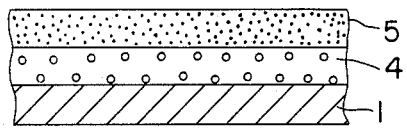
FIG. 3 is a sectional view of a second embodiment of the element for measurement of a UV-ray dose according to the present invention; and, FIG. 4 is a sectional view showing a preferred embodiment of the element for measurement of a UV-ray dose shown in FIG. 1.
Figure 4:
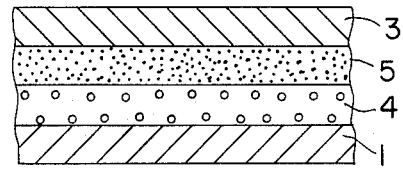

According to another embodiment of the element for measurement of a UV-raydose according to the present invention, as shown in FIG. 3 and FIG. 4, first a layer 4 containing a photo activator and a discoloring agent is applied on the support 1, and a layer 5 containing a UV-ray absorber is applied thereon. Further, if necessary, a transparent protective layer 3 as mentioned above can be coated thereon.

The amount ratios and coating amounts of the respective constituents of the UV-ray sensitive composition (or element for measurement of a UV-ray dose) according to the present invention are not particularly limited, but a preferable example is shown below.

| polymeric binder | 100 parts by weight |
| Photo activator | 0.1–100 parts by weight |
| Discoloring agent | 0.1–200 parts by weight |
| UV-ray absorber | 0.1–200 parts by weight |

Also, the coating amounts of the respective layers are not particularly limited, but are generally within the ratios as shown above, and it is desirable to apply a coating at a solid component weight of 0.01 to 20 g/m², preferably 1 to 10 g/m².

The thickness of the respective layers can be suitably selected, but generally the thickness of the support can be made 20 to 200 μm, and the layers containing the photo activator, discoloring agent, and/or UV-ray absorber be made 0.5 to 20 μm, and the protective layer be made 1 to 20 μm.

The UV-ray sensitive composition of the present invention forms free radicals from the photo activator corresponding to the irradiated dose when irradiated with UV-rays, and exhibits a conspicuously sharp change in color by acting on the discoloring agent. UV-ray sensitive compositions known in the prior art undergo an immediate change in color from an irradiation of light, within an extremely short time, and it is impossible to measure the irradiated dose of light (particularly sunlight) by the change in color. In contrast, the UV-ray sensitive composition of the present invention, by controlling the amount of free radicals generated from the photo activator during the irradiation of UV-rays, by the addition of a UV-ray absorber in addition to the photo activator and discoloring agent, the change in color is weakened, and thus a measurement of the irradiated dose of UV-rays is rendered possible by the change in color.

Accordingly, by preparing previously the standards in change of the irradiated dose of UV-rays and color, a measurement of irradiated dose of UV-ray is easily possible without a particularly skilled technique, and by analysis of the color according to a spectrophotometer, the irradiated dose of UV-rays can be measured with a high precision. Further, the UV-ray sensitive composition of the present invention will not bring about a change in coloration even after preservation for a long time, when preserved under light shielding, thus having a specific feature in that it can be satisfactorily provided for a measurement of the irradiated dose of UV-rays.

Also, even when exposed to various atmospheric conditions or solutions, so long as the photo activator, discoloring agent, and UV-ray absorber constituting the UV-ray sensitive composition are not corroded thereby, the change in color is exhibited by an irradiation of UV-rays without any interference with the measurement of the irradiated dose. Further, the influence of the temperature on the coloration by UV-ray irradiation of this UV-ray sensitive composition is negligible at $-20°$ to $60°$ C., and in addition, the coloration after irradiation does not substantially change over a lapse of time after such coloration when stored under light shielding, and therefore, an error such as that caused by a change with a lapse of time in measurement does not occur. Therefore, the UV-ray sensitive composition of the present invention can be stored under light shielding for a certain period of time after UV-ray irradiation, and again irradiated with UV-rays, whereby the total irradiated dose of UV-rays can be measured.

EXAMPLES

The present invention is described in more detail by referring to the following examples, but the present invention is not limited to these Examples as a matter of course.

EXAMPLE 1

| Solution I | |
| --- | --- |
| Leucocrystal violet | 1.0 g |
| Tetrabromodimethylsulfone | 0.1 g |
| Ethylene-vinyl acetate copolymer | 10 g |
| Toluene | 100 ml |
| | |
| Solution II | |
| 2-Ethylhexyl N,N-dimethyl paraaminobenzoate | 7 g |
| Ethylene-vinyl acetate copolymer | 10 g |
| Toluene | 100 ml |

The above solutions I and II were separately prepared, and first the solution I was applied on a paper base for photography to 1 g/m² as the solid component, and subsequently, the solution II was applied thereon to 5 g/m² as the solid component. The UV-ray sensitive composition thus obtained was exposed to sunlight, and the relationship between the irradiated dose of UV-ray and color was investigated. The irradiated dose of UV-rays was measured by a UV-ray irradiation dosemeter, and the color difference was calculated according to the LAB coordinate system with the color at the time of the irradiated dose=0 as the standard.

The results were as shown in Table 1.

TABLE 1

| Sample No. | Irradiated dose[1] [erg/cm²] | Hue | Color difference from the sample at irradiated dose of 0[2] |
|---|---|---|---|
| 1 | 0 | White | 0 |
| 2 | 500 × 10⁵ | Pale violet | 3.9 |
| 3 | 1000 × 10⁵ | Pale violet | 8.3 |
| 4 | 2000 × 10⁵ | Pale violet | 16.2 |
| 5 | 3000 × 10⁵ | Pale violet | 24.1 |
| 6 | 4000 × 10⁵ | Pale violet | 31.9 |
| 7 | 5000 × 10⁵ | Violet | 39.8 |
| 8 | 6000 × 10⁵ | Violet | 48.1 |
| 9 | 7000 × 10⁵ | Violet | 55.8 |
| 10 | 8000 × 10⁵ | Violet | 64.2 |
| 11 | 9000 × 10⁵ | Dark violet | 72.1 |
| 12 | 10000 × 10⁵ | Dark violet | 81.3 |

[1]Produced by Suga Co., measured by UV-ray irradiation dosemeter.
[2]Measured by Hitachi 607 Spectrophotometer, and calculated according to the LAB coordinate system.

As is apparent from the results in Table 1, the UV-ray sensitive composition according to the present invention is, for example, white before an irradiation of Uv-rays but the hue and the degree of color thereof are changed as the irradiated dose is increased. The change in hue is mild, and the irradiated dose can be preparing previously the standard in change of the irradiated dose of Uv-rays and the change in color, an irradiated dose of 10000×10⁵ [erg/cm²] corresponding to the irradiated dose of UV-rays in one day during midsummer could be easily measured without a skilled technique.

| Solution I | |
|---|---|
| Leucomethylene blue | 1 g |
| α,α,α-Tribromoacetophenone | 0.5 g |
| Ethylene-vinyl acetate copolymer | 10 g |
| Xylene | 100 ml |
| Solution II | |
| 2-Hydroxy-4-methoxybenzophenone | 5 g |
| Ethylene-vinyl acetate copolymer | 10 g |
| Xylene | 100 ml |

The above solutions I and II were separately prepared, and the solution I was first applied on a plastic film to 2 g/m² as the solid component, and subsequently the solution II to 6 g/m² as the solid component. The Uv-ray sensitive composition thus obtained was evaluated as in Example 1.

The results were as shown in Table 2.

TABLE 2

| Sample No. | Irradiated dose [erg/cm²] | Hue | Color difference |
|---|---|---|---|
| 1 | 0 | White | 0 |
| 2 | 100 × 10⁵ | Pale blue | 3.0 |
| 3 | 200 × 10⁵ | Pale blue | 5.9 |
| 4 | 400 × 10⁵ | Pale blue | 12.1 |

TABLE 2-continued

| Sample No. | Irradiated dose [erg/cm²] | Hue | Color difference |
|---|---|---|---|
| 5 | 600 × 10⁵ | Pale blue | 17.9 |
| 6 | 800 × 10⁵ | Pale blue | 23.8 |
| 7 | 1200 × 10⁵ | Blue | 36.1 |
| 8 | 1600 × 10⁵ | Blue | 49.3 |
| 9 | 2000 × 10⁵ | Blue | 60.3 |
| 10 | 2400 × 10⁵ | Blue | 70.0 |
| 11 | 3200 × 10⁵ | Dark blue | 78.3 |
| 12 | 4000 × 10⁵ | Dark blue | 85.7 |

As is apparent from the results in Table 2, also in his case the irradiated dose of UV-rays of 4000×10⁵ could be easily measured without a skilled technique, as in Example 1.

EXAMPLE 3

| Solution I | |
|---|---|
| Leucomethylene green | 1 g |
| Trichloromethylphenylsulfone | 1 g |
| 2-(2'-Hydroxy-5'-methylphenyl)benzotriazole | 5 g |
| Ethylene-vinyl acetate copolymer | 10 g |
| Toluene | 100 ml |

The above solution I was prepared and applied on a paper base for photography to 5 g/m² as the solid component. The UV-ray sensitive composition thus obtained was evaluated as in Example The results were as shown in Table 3.

TABLE 3

| Sample No. | Irradiated dose [erg/cm²] | Hue | Color difference |
|---|---|---|---|
| 1 | 0 | White | 0 |
| 2 | 100 × 10⁵ | Pale green | 6.9 |
| 3 | 200 × 10⁵ | Pale green | 13.8 |
| 4 | 300 × 10⁵ | Pale green | 20.8 |
| 5 | 400 × 10⁵ | Pale green | 27.9 |
| 6 | 500 × 10⁵ | Pale green | 35.3 |
| 7 | 600 × 10⁵ | Green | 42.2 |
| 8 | 700 × 10⁵ | Green | 49.8 |
| 9 | 800 × 10⁵ | Green | 56.2 |
| 10 | 1000 × 10⁵ | Green | 65.0 |
| 11 | 1200 × 10⁵ | Dark green | 74.0 |
| 12 | 1400 × 10⁵ | Dark green | 82.3 |

As is apparent from the results in Table 3, also in this case the irradiated dose of UV-rays of 4000×10⁵ [erg/cm²] could be easily measured without a skilled technique, as in Example 1.

EXAMPLE 4

| Solution I | |
|---|---|
| Leucomethylene blue | 5 g |
| Trichloromethylphenylsulfone | 5 g |
| Ethylene-vinyl acetate copolymer | 10 g |
| Benzene | 100 ml |
| Solution II | |
| 2-Ethylhexyl N,N—dimethyl paraamino-4-methoxybenzophenone | 5 g |
| Ethylene-vinyl acetate copolymer | 10 g |
| Benzene | 100 ml |

The above solutions I and II were separately prepared, and the solution I was first applied on an original paper for photography to 4 g/m² as the solid component, and subsequently, the solution 11 thereon to 4 g/m² as the solid component. The UV-ray sensitive composition thus obtained was investigated as in Example 1.

The results were as shown in Table 4.

TABLE 4

| Sample No. | Irradiated dose [erg/cm²] | Hue | Color difference |
|---|---|---|---|
| 1 | 0 | White | 0 |
| 2 | 50 × 10⁵ | Pale blue | 4.9 |
| 3 | 100 × 10⁵ | Pale blue | 10.0 |
| 4 | 150 × 10⁵ | Pale blue | 14.9 |
| 5 | 200 × 10⁵ | Pale blue | 20.1 |
| 6 | 150 × 10⁵ | Pale blue | 25.2 |
| 7 | 300 × 10⁵ | Blue | 30.2 |
| 8 | 400 × 10⁵ | Blue | 40.0 |
| 9 | 500 × 10⁵ | Blue | 49.8 |
| 10 | 600 × 10⁵ | Blue | 60.4 |
| 11 | 700 × 10⁵ | Dark blue | 70.1 |
| 12 | 800 × 10⁵ | Dark blue | 81.2 |

As is apparent from the results in Table 4, also in this case the irradiated dose of UV-rays of $800 \times 10^5$ [erg/cm²] could be easily measured without a skilled technique, as in Example 1.

EXAMPLE 5

| Solution I | |
|---|---|
| 3-Diethylamino-benzo(a)-fluorane | 5 g |
| Tribromomethylphenylsulfone | 5 g |
| Linear polyester | 10 g |
| 2-Butanone | 100 ml |
| Solution II | |
| 2-Hydroxy-4-methoxybenzophenone | 5 g |
| Linear polyester | 10 g |
| 2-Butanone | 100 ml |

The above solutions I and II were separately prepared, and the solution I was first applied on a plastic film to 2 g/m² as the solid component, and subsequently, the solution II to 5 g/m² thereon as the solid component. The Uv-ray sensitive composition thus obtained was evaluated as in Example 1.

The results were as shown in Table 5.

TABLE 5

| Sample No. | Irradiated dose [erg/cm²] | Hue | Color difference |
|---|---|---|---|
| 1 | 0 | White | 0 |
| 2 | 100 × 10⁵ | Pale pink | 6.0 |
| 3 | 200 × 10⁵ | Pale pink | 11.0 |
| 4 | 300 × 10⁵ | Pale pink | 15.5 |
| 5 | 400 × 10⁵ | Pale pink | 21.3 |
| 6 | 500 × 10⁵ | Pink | 27.4 |
| 7 | 750 × 10⁵ | Pink | 42.6 |
| 8 | 1000 × 10⁵ | Pink | 53.4 |
| 9 | 1500 × 10⁵ | Dark pink | 65.0 |
| 10 | 2000 × 10⁵ | Dark pink | 83.0 |

As is apparent from the results in Table 5, also in this case the irradiated dose of UV-rays of $2000 \times 10^5$ [erg/cm²] could be easily measured without a skilled technique, as in Example 1.

EXAMPLE 6

| Solution I | |
|---|---|
| Bis(4-diethylamino-2-methyphenyl)- phenylmethane | 5 g |
| Tribromomethylphenylsulfone | 2.5 g |
| Polycarbonate | 10 g |
| Methyl chloride | 150 ml |
| Solution II | |
| 2-Hydroxy-4-methoxybenzophenone | 5 g |
| Polycarbonate | 10 g |
| Methyl chloride | 150 ml |

The above solutions I and II were separately prepared, and the solution I was first applied on a plastic film to 5 g/m² as the solid component, and subsequently, the solution II to 2g/m² thereon as the solid component. The UV-ray sensitive composition thus obtained was evaluated as in Example 1.

The results were as shown in Table 6.

TABLE 6

| Sample No. | Irradiated dose [erg/cm²] | Hue | Color difference |
|---|---|---|---|
| 1 | 0 | White | 0 |
| 2 | 25 | Pale green | 7.2 |
| 3 | 50 | Pale green | 13.6 |
| 4 | 75 | Pale green | 19.0 |
| 5 | 100 | Pale green | 25.0 |
| 6 | 150 | Green | 35.1 |
| 7 | 200 | Green | 42.9 |
| 8 | 250 | Green | 54.6 |
| 9 | 300 | Green | 65.1 |
| 10 | 350 | Dark green | 77.3 |
| 11 | 400 | Dark green | 83.0 |

As is apparent from the results in Table 6, also in this case the irradiated dose of UV-rays of $400 \times 10^5$ [erg/cm²] could be easily measured without a skilled technique, as in Example 1.

EFFECT OF THE INVENTION

As described above, since the UV-ray sensitive composition of the present invention undergoes a color change corresponding to the UV-ray irradiated dose, the irradiated dose of UV-rays can be measured extremely easily without requiring a skilled technique. Accordingly, the composition of the present invention can be used suitably as the element for measurement of a UV-ray irradiated dose as described above, and can be applied as printed matter (e.g., a poster) which is changed in color by UV-rays, and further, the above element for measuring the dose of UV-rays can be utilized as a medical aid for patients hypersensitive to sunlight, by which the patients hypersensitive to sunlight can easily determine the dose of UV-rays to which they have been exposed, semiquantitatively, an implement for simply measuring the UV-ray protective function of cosmetics, or as an implement for measuring the exposed amount of UV-rays at living level and attached to a badge, pendant, bracelet, watch, earring, spectacles, hair pin, hair band, etc.

We claim:
1. A UV-ray sensitive composition, comprising a photo activator forming a free radical by irradiation of UV-rays, a discoloring agent which exhibits a color change in visible region of spectrum through the action of this free radical, and a UV-ray absorber for controlling the amount of free radicals generated.
2. An element for measuring a UV-ray dose, comprising a UV-ray sensitive composition comprising a photo activator forming a free radical by irradiation of UV- rays, a discoloring agent which exhibits a color change in visible region of spectrum through the action of this free radical, and a UV-ray absorber layered on a support for controlling the amount of free radicals generated.

3. An element for measurement of a UV-ray dose comprising a first layer comprising a photo activator forming a free radical by irradiation of UV-rays and a discoloring agent exhibiting a color change in visible region of spectrum by the action of this free radical, and a second layer comprising a UV-ray absorber layered on a support for controlling the amount of free radicals generated.

4. A composition according to claim 1, wherein the photo activator is selected from the group consisting of

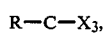 (I)

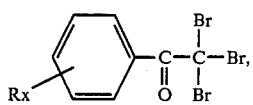 (II)

 (III)

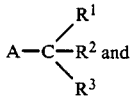 and (IV)

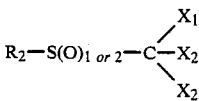 (V)

in which
R is allyl, alkyl, aralkyl, aroyl, alkenyl, halogen or hydrogen,
X is halogen,
$R_x$ is form 1 to 5 substituents independently selected from nitro, halogen, alkyl, haloalkyl, acetyl, haloacetyl, alkaryl and alkoxy,
$R_1$ is optionally substituted allyl or alkyl,
A is an optionally substituted heterocyclic radical,
$R_1$, $R_2$ and $R_3$ each independently is hydrogen, chlorine or bromine but all three are not simultaneously hydrogen,
$R_2$ is an optionally substituted aryl or heterocyclic radical, and
$X^1$, $X^2$ and $X^3$ each independently is hydrogen, chlorine or bromine.

5. A composition according to claim 1, wherein the discoloring agent is selected from the group consisting of diphenylamine, dibenzylamine, triphenylamine, N-hydroxyethyl-N-ethylaniline, p,p'-methylenebis(N-N-diethylaniline), leucocrystal violet, leucomalachite green, Michler's hydrol, 3-diethylamino-7-chlorofluoran, 3-methylamino-6-chlorofluran, 3-dimethylamino-6-methoxyfluoran, 3-cyclohexylamino-6-chlorofluroan, 3-diethylaminobenzo (a)-fluran, 3-diethylamino-6-aminofluoran, 3,6-dimethoxyfluran, 3-diethylamino-7-dibenzyl-aminofluoran, 3,6-dimethoxyfluoran, 3-diethylamino-7-dibenzylaminofluoran, 3-diethylamino-6-methyl-7-chlorofluoran, bis(4-diethylamino-2-methylphenyl)phenylmethane, tris(4-diethylamino-2-methylphenyl)methane, bis(4-diethylamino-2-methylphenyl)(4-diethylaminophneyl)methane, bis(4-diethylamino-2-methylphenyl) (3-4-dimethoxyphenyl) methane, bis(4-dibenzylamino-2-methylphenyl) phenylmethane, 1-phenyl-3-(p-diethylamino)styryl-5-(p-diethylamino) phenylpyrazoline, Auramine, Victoria Blue, benzoylmethylene blue, cinnamoylmethylene blue, rhodamine, 4-p-diethylaminophenyliminonaphthoquinone, p-methoxybenzoyl-p-diethylamino-o-methylphenyliminoacetoanilide and 1-phenyl-3-methyl-4-diethylaminophenylimino-5-pyrazolone.

6. A composition according to claim 1, wherein the UV-ray absorber is selected from the group consisting of a derivative of p-aminobenzoic acid, cinnamic acid, salicylic acid, camphor, benzophenone, urocanic acid and a nitrogen containing heterocyclic.

* * * * *

UNITED STATES PATENT AND TRADEMARK OFFICE
CERTIFICATE OF CORRECTION

PATENT NO. : 4,829,187

Page 1 of 2

DATED : May 9, 1989

INVENTOR(S) : Tomita et al.

It is certified that error appears in the above-identified patent and that said Letters Patent is hereby corrected as shown below:

| | |
|---|---|
| Title Page | U.S. PATENT DOCUMENTS: After " 3,902,903, 9/1975 " delete " Stano " and substitute -- Itano -- |
| Col. 12, claim 5 line 19 | Delete " chlorofluran " and substitute -- chlorofluoran -- |
| Col. 12, claim 5 line 20 | Delete " chlorofluroan " and substitute -- chlorofluoran -- |
| Col. 12, claim 5 line 21 | Delete " fluran " and substitute -- fluoran -- |
| Col. 12, claim 5 line 22 | Delete " dimethoxyfluran " and substitute -- dimethoxyfluoran -- |
| Col. 12, claim 5 lines 23-24 | Delete " 3,6-dimethoxyfluoran, 3 diethylamino 7 dibenzylaminofluoran, " |
| Col. 12, claim 5 line 27 | After " methane, " insert -- bis (4-dimethylamino-2-methoxyphenyl) phenylmethane -- |

UNITED STATES PATENT AND TRADEMARK OFFICE
CERTIFICATE OF CORRECTION

PATENT NO. : 4,829,187

DATED : May 9, 1989

INVENTOR(S) : Tomita et al

It is certified that error appears in the above-identified patent and that said Letters Patent is hereby corrected as shown below:

Column 12, line 28, claim 5; Delete "diethylaminophneyl" and substitute --diethylaminophenyl--

Column 12, line 37, claim 5; After "4" insert --p--

Signed and Sealed this

Twelfth Day of May, 1992

Attest:

DOUGLAS B. COMER

*Attesting Officer*   *Acting Commissioner of Patents and Trademarks*